Figure 1:
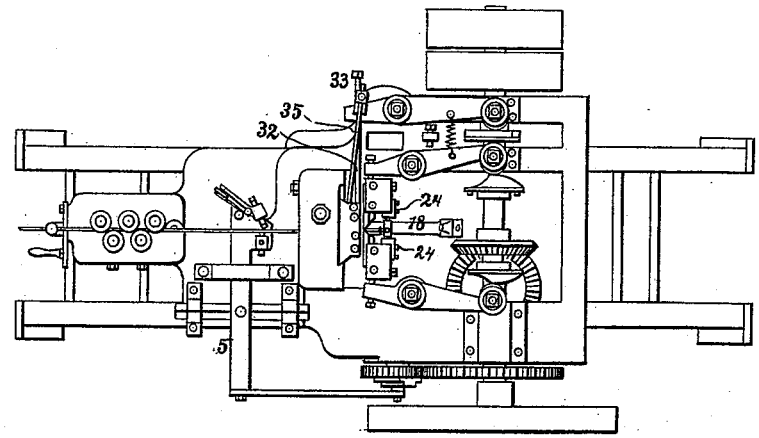
Figure 1:
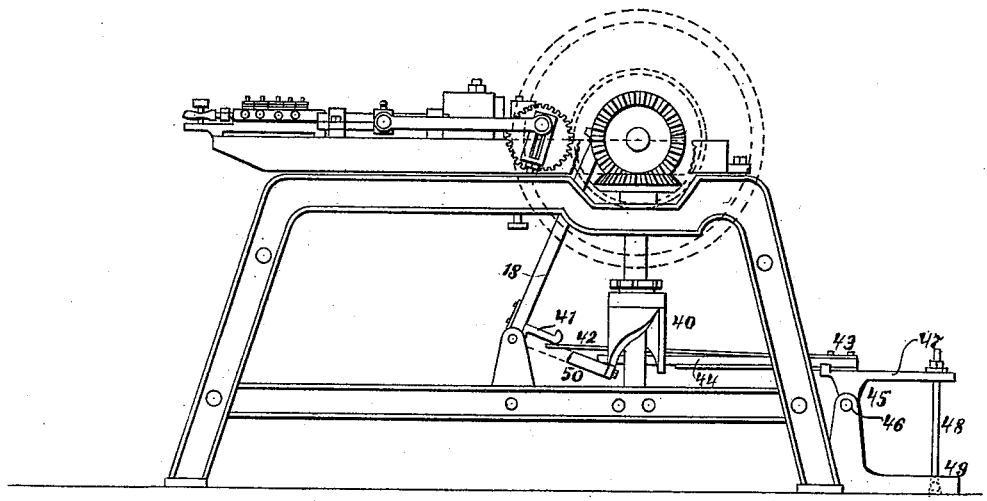

(No Model.) 2 Sheets—Sheet 1.

E. B. ROTH & G. R. BISPHAM.
WIRE NAIL MACHINE.

No. 493,222. Patented Mar. 7, 1893.

Fig. II

Attest:
Walter E. Allen.
Geo. E. Cruse

Inventors:
George R. Bispham
Edward B. Roth
By Wright Bros
atty's (No Model.) 2 Sheets—Sheet 2.
E. B. ROTH & G. R. BISPHAM.
WIRE NAIL MACHINE.
No. 493,222. Patented Mar. 7, 1893.
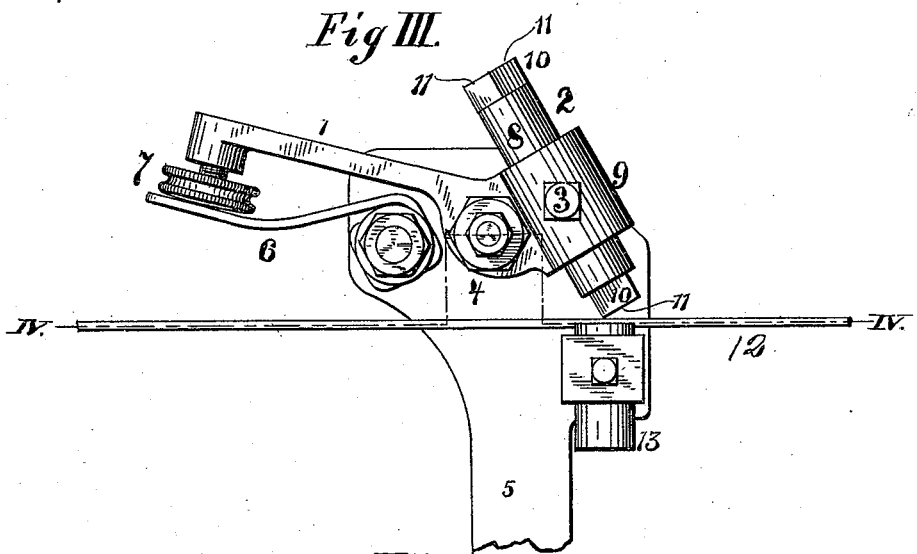
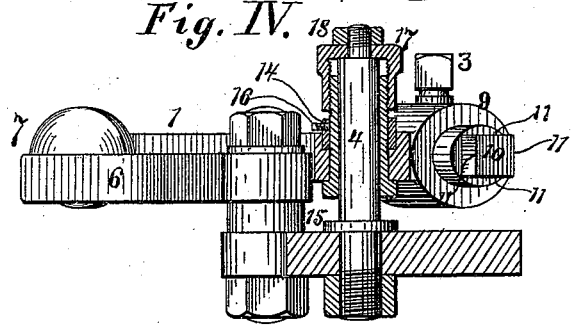
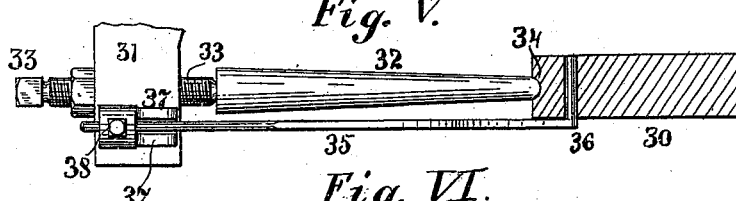
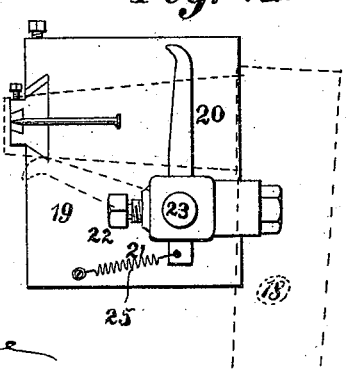
Attest:
Walter E. Allen
Geo. E. Cruse
Inventors:
George R. Bispham
Edward B. Roth
By Wright Bros
Attys.

UNITED STATES PATENT OFFICE.

EDWARD B. ROTH AND GEORGE R. BISPHAM, OF ST. LOUIS, MISSOURI, ASSIGNORS, BY MESNE ASSIGNMENTS, TO THE P. & B. NAIL MACHINE COMPANY, OF SAME PLACE.

WIRE-NAIL MACHINE.

SPECIFICATION forming part of Letters Patent No. 493,222, dated March 7, 1893.

Application filed August 20, 1892. Serial No. 443,616. (No model.)

*To all whom it may concern:*

Be it known that we, EDWARD B. ROTH and GEORGE R. BISPHAM, both of the city of St. Louis, in the State of Missouri, have invented a certain new and useful Improvement in Wire-Nail Machines, of which the following is a full, clear, and exact description, reference being had to the accompanying drawings, forming part of this specification.

Our invention relates to certain improvements in the machine shown and described in United States Letters Patent, No. 429,950, issued June 10, 1890, to H. E. Piggott and George R. Bispham.

Our invention consists in features of novelty hereinafter fully described and pointed out in the claims.

Figure I is a top or plan view of our improved machine. Fig. II is a side elevation. Fig. III is an enlarged, detail, top view of the feeder. Fig. IV is a section on line IV—IV, Fig. III. Fig. V is an enlarged, detail view, showing the means for moving the knife-blocks. Fig. VI is an enlarged view of the "kicker" or mechanism for breaking the nails off after they are formed.

The machine in the main is like that shown and described in the patent referred to, and will need no explanation, and we will confine our description to the parts which we have invented and added.

In the first place our invention relates to a new form of feeder, (see Figs. III and IV.) In the patent mentioned the feeder is shown and described as a wire gripper or tooth held in a spring pressed dog or pawl 31. The part which we term a holder in this application, and which is identified by the numeral 1, corresponds to the spring pressed dog or pawl of said patent, and the part which we term a bit in this application, and which is identified by the numeral 2, corresponds to the gripper or tooth of said patent. The bit is held in the holder by a set screw 3 and the holder is pivoted at 4 to a lever 5 corresponding to the lever at 27 in the patent. 6 is a spring secured to the lever 5 and which presses against a set screw 7 in the outer end of the holder 1. The tension of the spring can be increased or diminished by the screw 7. The body 8 of the bit 2, which fits in the head 9 of the holder, is preferably cylindrical, and the ends 10 of the bit are non-circular (preferably square), forming two or more edges 11 which may respectively be brought into using position by turning the bit in the holder. Each end of the bit is preferably made with the edges 11, so that it can be turned end for end when one end becomes worn. 12 is the wire from which the nails are made, and which is moved by the feeder as in said patent, 13 representing the plug against which the bit forces the wire, as in the patent.

Much difficulty has been experienced in making a feeder which will last and be effective for any substantial length of time, as the working surface of the bit is very rapidly worn away, so that it has to be sharpened or renewed very frequently. The object of our invention is to so form and arrange a feeder that by simple adjustments it may be made to last for a considerable length of time without being sharpened or renewed. With the arrangement thus far shown and described, it will be seen that as soon as one edge 11 becomes worn so that it will not bite or grasp the wire readily, another edge may be brought into using position by simply loosening on the set screw 3, turning the bit, and then tightening the set-screw again; and when all of the working edges of one end of the bit are worn, the bit can be turned end for end and the other end utilized.

To further lengthen the time of the use of the bit, by mere adjustments of screws, and without having to sharpen the bit, we provide for a vertical adjustment so that the entire surface of each edge 11 can be utilized. This is accomplished by mounting the holder so that it can be vertically adjusted on the pivot pin 4. As a desirable means for thus adjusting the holder, we use a sleeve 14 which fits loosely over the pin 4, so that it can be moved up and down thereon. This sleeve has a flange 15 on its lower end, between which and a ring 16 the holder fits; the ring 16 being held to the sleeve by a set screw. The sleeve 14 is externally threaded to receive an internally threaded cap 17, fitted on the pin 4, and held thereon by a nut 18. It will thus be seen that by turning the cap 17, the sleeve 14 will be raised and lowered, and with it the holder which carries the bit, and thus the vertical position of the bit is changed very quickly and readily so as to utilize the entire vertical working surface of each edge 11 of the bit.

By forming the bit as we have shown and described, and by providing for the adjustments which we have explained, a single bit may be used for a considerable length of time by simply adjusting it in a second's time, while the machine is in operation.

When all of the working edges of the bit become dulled, it can be sharpened by simply holding its flat end against a suitable grinder, or it may be filed down to remove the roundness of its ends.

In the operation of the machine the holder is adjusted vertically so as to bring either the upper or lower corner of one of the edges 11 in contact with the wire, and the spring 6 is given the proper tension. As the work progresses, the feeder is adjusted vertically by turning the cap 17 so as to work entirely across the edge 11. This wears the edge slightly all the way across so that the nipping efficiency of bit on the wire is slightly diminished. The nipping efficiency of the thus slightly dulled edge is then restored by increasing the tension on the spring 6, through means of the set-screw 7; and then, as the work progresses, the feeder is moved vertically again at intervals, (a very slight adjustment taking place each time,) until the entire edge 11 has been gone over again; then the tension of the spring 6 is still further increased, and the operation repeated until the edge 11 is worn down until it can no longer do efficient service. Another edge 11 is then brought into use, and the operation repeated, and so on until all of the edges have been utilized, when the bit is removed and sharpened. A bit thus formed and arranged has been found in practice to be capable of use for a considerable length of time by mere adjustment, whereas the bits as heretofore used have required sharpening very frequently.

The next part of our invention relates to a "kicker," or a device for breaking off the nails after each one is formed, in case they should not be entirely cut off by the knife. The device is best represented in Figs. I and VI, where the upper end of the hammer 18, (which may be the same as the upper end of the hammer 5 of the patent,) is shown in dotted lines. 19 represents the knife carriers, corresponding to the carriers 18 of the patent. 20 represents a finger secured in a head 21 by a set screw 22, the head being provided with journals or arbors 23, fitting in brackets 24, by which the kicker is secured to the carriers 19. It will thus be seen that the finger 20 is free to move from the position shown in full lines, Fig. VI, to the position shown in dotted lines. It is thus moved each time the hammer advances to form the head of a nail. The finger is so disposed that it moves across the path of the nails, should they be adhering to the wire, as it is fed forward to form another nail, as shown in Fig. VI. Of course, if the nails are entirely cut off, they will drop down when the wire is fed forward, but it is seldom that they are entirely cut off, for it is desirable to adjust the knives so that they will not quite come in contact with each other, to avoid dulling them. When the nails are not entirely cut off, they are struck by the kicker when the latter is forced down by the hammer to its position shown in dotted lines, and thus a durable, effective and thoroughly satisfactory kicker is afforded at a slight cost. When the hammer recedes, the kicker is brought back to its upright position, by a suitable spring 25.

The next part of our improvement relates to a device for moving the movable jaw 30 of the grip and heading dies; it is best shown in Figs. I and V. 31 represents the lever 22 of the patient referred to. The jaw is moved by the lever, through the medium of a push rod or bar 32, which, at the outer end, is centered in a set screw 33, which passes through the lever 31, and which at the inner end fits in a recess 34 formed in the jaw 30. The rigid rod or bar 32 is thus not connected or made fast to either the lever or the jaw, but simply rests between the recess 34 of the jaw, and the inner end of the set-screw 33, so that it is free to rock slightly as the lever 31 moves in the arc of a circle on its pivot, thus producing no strain, and no tendency to move the jaw out of its working plane. 35 represents a spring rod made fast to the movable jaw 30 at 36, and which fits between ears 37 on the lever 31, and is provided with a collar and set screw 38 on its outer end, which collar bears against the ears 37. This rod 35 serves to pull the jaw 30 back to its open position, and holds the rigid bar or rod 32 firmly in its end bearings. There is sufficient spring in the rod 35 to prevent the movement of the lever on the arc of its circle from imparting any strain to the jaw, as this rod 35 is made quite light, inasmuch as it only has to pull the jaw back, and is not required to push the jaw forward. By adjusting the collar 38 and set screw 33, the length of the parts and the distance between the lever 31 and jaw 30 can be regulated to compensate for wear.

The next part of our improvement relates to the spring device for imparting the forward movement or blow to the hammer, (see Fig. II.) 40 represents a cam, corresponding to the cam on the shaft 39 of the patent, for moving the hammer. We form a projection 41 on the hammer, which bears against the inner end of a metal spring plate 42, secured at 43 to a spring wood bar 44, made fast to a head 45 pivoted at 46. The head has a rearward extension 47 connected by a rod 48 to a fixed point 49. As the hammer is moved back by the cam 40, the springs 42 and 44 are compressed, and as the cam leaves the projection 50 of the hammer, the springs thrust the hammer forcibly forward to form the head on the nail.

We claim as our invention—

1. In a wire nail machine, a feeder consisting of a spring pressed holder, and a movable bit having two or more sharp edges on one end, substantially as and for the purpose set forth.

2. In a wire nail machine, a feeder consisting of a spring pressed holder and a reversible bit having two or more sharp edges on each end; substantially as, and for the purpose set forth.

3. In a wire nail machine, a feeder consisting of a spring pressed holder and a bit having one or more wide, sharp edges, and means for adjusting said feeder vertically, substantially as and for the purpose set forth.

4. In a wire nail machine, a feeder consisting of a spring pressed holder and a bit secured to the holder, and having two or more sharp edges and means for vertically adjusting the holder so as to utilize the entire surface of the edges; substantially as and for the purpose set forth.

5. In a wire nail machine, a feeder consisting of a spring pressed holder and a bit removably held in the holder; said holder being arranged to be moved vertically, and said bit having two or more sharp edges on each end; substantially as and for the purpose set forth.

6. In a wire nail machine, a feeder consisting of the combination of a spring pressed holder, a bit secured to the holder and having two or more sharp edges and means for vertically adjusting the holder, consisting of a pin upon which the holder is pivoted, a sleeve upon which the holder is mounted, and upon which it is held from vertical movement, and a threaded cap engaging said sleeve, substantially as and for the purpose set forth.

7. In a wire nail machine, a feeder consisting of a spring pressed holder, means for vertically adjusting the holder, and a bit having a cylindrical body portion fitting in said holder, and in which it is adapted to be reversed, and having non-circular ends forming sharp edges 11, substantially as, and for the purpose set forth.

8. In a wire nail machine, a feeder consisting of a holder, a bit secured in the holder and which has a wide nipping edge, means for adjusting the feeder so as to utilized substantially the entire working edge, and a spring with means for regulating its tension, and which serves to hold the bit to its work, substantially as and for the purpose set forth.

9. In a wire nail machine, a feeder consisting of a holder, a bit secured to the holder, means for adjusting the holder vertically, a spring and a set screw located between the spring and the holder, substantially as and for the purpose set forth.

10. In a wire nail machine, in combination with a hammer for forming the heads of the nails, a kicker consisting of a head pivoted to the knife carriers and a finger adjustably held in said head, and which is adapted to be struck by the hammer, and moved on its pivot; substantially as and for the purpose set forth.

11. In a wire nail machine, the combination of a movable jaw, a pivoted lever for moving the jaw, a rigid bar or pin fitting at one end in a recess formed in the jaw, a set screw passing through said lever, and centered in the other end of said rod or bar, and a spring rod adjustably connecting said jaw to said lever; substantially as and for the purpose set forth.

12. In a wire nail machine, the combination of a hammer for forming the heads on the nails, and means for imparting forward movement to said hammer, consisting of a spring plate, a head to which the spring plate is secured, and which is pivoted to a support, and a rod connecting an extension on the head to a fixed object; substantially as and for the purpose set forth.

13. In a wire nail machine, the combination of a hammer for forming the heads on the nails, and means for forcing the hammer forward, consisting of a metallic spring plate, a wood plate beneath the metal plate, a head to, which said plates are secured, and which is pivoted to a support, an extension on said plate, and a rod securing said extension to a fixed object; substantially as and for the purpose set forth.

EDWARD B. ROTH.
GEORGE R. BISPHAM.

In presence of—
GEO. H. KNIGHT,
ALBERT M. EBERSOLE.